United States Patent
Honda et al.

(10) Patent No.: US 10,415,813 B2
(45) Date of Patent: Sep. 17, 2019

(54) LUMINAIRE

(71) Applicant: Panasonic Intellectual Property Management Co., Ltd., Osaka (JP)

(72) Inventors: Yoshiaki Honda, Kyoto (JP); Takaaki Ukeda, Osaka (JP); Tatsuo Masuda, Osaka (JP); Tadashi Murakami, Osaka (JP); Shigeo Gotoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 210 days.

(21) Appl. No.: 15/612,004

(22) Filed: Jun. 2, 2017

(65) Prior Publication Data

US 2017/0350580 A1 Dec. 7, 2017

(30) Foreign Application Priority Data

Jun. 3, 2016 (JP) .................................. 2016-112202

(51) Int. Cl.
| | |
|---|---|
| *F21V 23/04* | (2006.01) |
| *F21S 8/00* | (2006.01) |
| *F21S 8/04* | (2006.01) |
| *G01S 13/56* | (2006.01) |
| *G01S 13/88* | (2006.01) |
| *F21Y 115/10* | (2016.01) |
| *G01S 7/02* | (2006.01) |

(52) U.S. Cl.
CPC .......... *F21V 23/0471* (2013.01); *F21S 8/033* (2013.01); *F21S 8/04* (2013.01); *G01S 13/56* (2013.01); *G01S 13/88* (2013.01); *F21Y 2115/10* (2016.08); *G01S 2007/027* (2013.01)

(58) Field of Classification Search
None
See application file for complete search history.

(56) References Cited

U.S. PATENT DOCUMENTS

| | | | |
|---|---|---|---|
| 2012/0212380 A1* | 8/2012 | Theobold | A61B 5/08 343/720 |
| 2016/0240056 A1* | 8/2016 | Chen | G08B 13/2491 |

FOREIGN PATENT DOCUMENTS

JP 2009-168778 A 7/2009

* cited by examiner

*Primary Examiner* — Whitney Moore
(74) *Attorney, Agent, or Firm* — McDermott Will & Emery LLP

(57) ABSTRACT

A luminaire includes a radio wave sensor and a luminaire body. The luminaire body includes a first plate to be attached to a building surface and a second plate facing each other forming an internal space. The luminaire body holds the radio wave sensor between the first plate and the second plate. The radio wave sensor includes an antenna for transmitting and receiving the radio waves. The luminaire body includes an opening and a limiter. The opening is formed in the second plate to allow radio waves transmitted from the antenna to exit to an outside of the luminaire body. The limiter is provided between the antenna and the opening to limit a radiation area of the radio waves transmitted from the antenna.

12 Claims, 10 Drawing Sheets

LUMINAIRE

CROSS-REFERENCE TO RELATED APPLICATION

The present application is based upon and claims the benefit of priority of Japanese Patent Application No. 2016-112202, filed on Jun. 3, 2016, the entire contents of which are incorporated herein by reference.

TECHNICAL FIELD

The present disclosure relates generally to luminaires and, more particularly, to an luminaire including a radio wave sensor for detecting an object.

BACKGROUND ART

Conventionally, there has been known a luminaire including an active sensor for detecting a moving object such as a human body by use of transmitting and receiving radio waves, which is disclosed e.g., in Document 1 (JP 2009-168778A). In the luminaire disclosed in Document 1, the active sensor is installed to a ceiling to send radio waves toward a floor surface. In this luminaire, a cover member is provided near an antenna of the active sensor so that a transmission area of the active sensor is not covered by the cover member. The cover member is made of material having a radio wave blocking property.

In the luminaire disclosed in Document 1, the cover member is provided in order to reduce an influence of reflected waves coming from another direction, and is located apart from the active sensor so as not to affect a detection area of the active sensor. Accordingly, unnecessary external radio waves and reflected waves are less likely to reach the antenna.

In luminaires such as the above conventional example, desired detection area of an active sensor (radio wave sensor) would vary depending on an installation location of the luminaire. However, in order to obtain a desired detection area of the radio wave sensor in the luminaire of the above conventional example, arrangement of the radio wave sensor needs to be changed by, for example, adjusting a tilting angle of the radio wave sensor. Therefore, a setting work of the detection area of the radio wave sensor may be difficult.

SUMMARY

The present disclosure is made in view of the above circumstances, and an object of the present disclosure is to provide a luminaire of which setting work of the detection area of the radio wave sensor can be simplified.

A luminaire according to an aspect of the present disclosure includes a radio wave sensor and a luminaire body. The radio wave sensor is configured to determine whether an object is present in a detection area, based on a Doppler effect resulting from a movement of the object, by using radio waves. The luminaire body includes a first plate to be attached to a building surface and a second plate facing each other forming an internal space, and holds the radio wave sensor between the first plate and the second plate. The radio wave sensor includes an antenna for transmitting and receiving the radio waves. The luminaire body includes an opening and a limiter. The opening is formed in the second plate to allow radio waves transmitted from the antenna to exit to an outside of the luminaire body. The limiter is provided between the antenna and the opening to limit a radiation area of the radio waves transmitted from the antenna.

BRIEF DESCRIPTION OF THE DRAWINGS

The figures depict one or more implementations in accordance with the present teaching, by way of example only, not by way of limitations. In the figure, like reference numerals refer to the same or similar elements.

DETAILED DESCRIPTION

Hereinafter, a luminaire 1 according to the present embodiment will be described. However, configurations mentioned below are merely examples of the present disclosure. The present disclosure is not limited to the configurations mentioned below. Even in other than the configurations mentioned below, numerous modifications and variations can be made according to designs and the like without departing from the technical ideas according to the present disclosure.

(1) Outline

Figure 1:
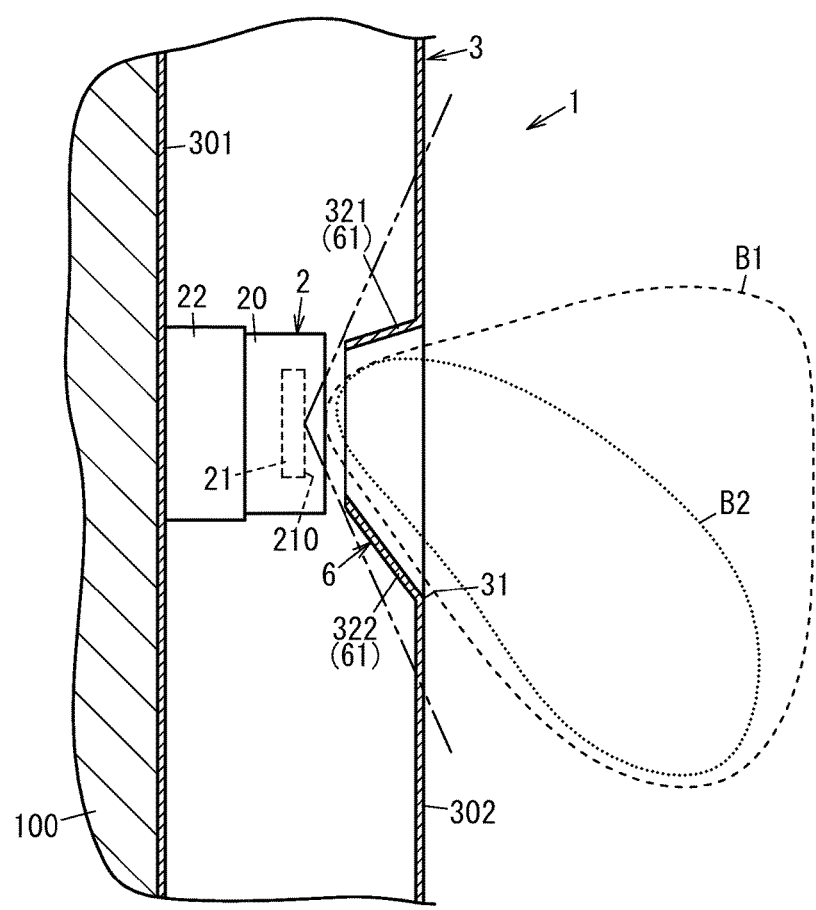
FIG. 1 is a cross-sectional view of a main part of a luminaire according to an embodiment.

As shown in FIG. 1, a luminaire 1 of the present embodiment includes a radio wave sensor 2, and a luminaire body 3. The radio wave sensor 2 is configured to determine whether an object is present in a detection area B1, based on a Doppler effect resulting from a movement of the object, by using radio waves. The luminaire body 3 includes a first plate 301 to be attached to a building surface (a wall, in the embodiment) 100 and a second plate 302 facing each other forming an internal space. The luminaire body 3 holds the radio wave sensor 2 between the first plate 301 and the second plate 302. The radio wave sensor 2 includes an antenna 21 for transmitting and receiving the radio waves.

The luminaire body 3 includes an opening 31 and a limiter 6. The opening 31 is formed in the second plate 302 to allow radio waves transmitted from the antenna 21 to exit to an outside of the luminaire body 3. The limiter 6 is provided between the antenna 21 and the opening 31 to limit a radiation area of the radio wave transmitted from the antenna 21.

(2) Details

Hereinafter, the luminaire 1 according to the present embodiment will be described in detail with reference to FIGS. 1 to 3. In the following explanations, directions (upper, lower, left, right, front and back sides) are defined by arrows shown in FIGS. 2A and 2B. Those arrows are illustrated merely for convenience of explanation, and the arrows each do not have materiality. The purpose of the directions defined above is not to restrict a use form of the luminaire 1 of the present embodiment.

Figure 2A:
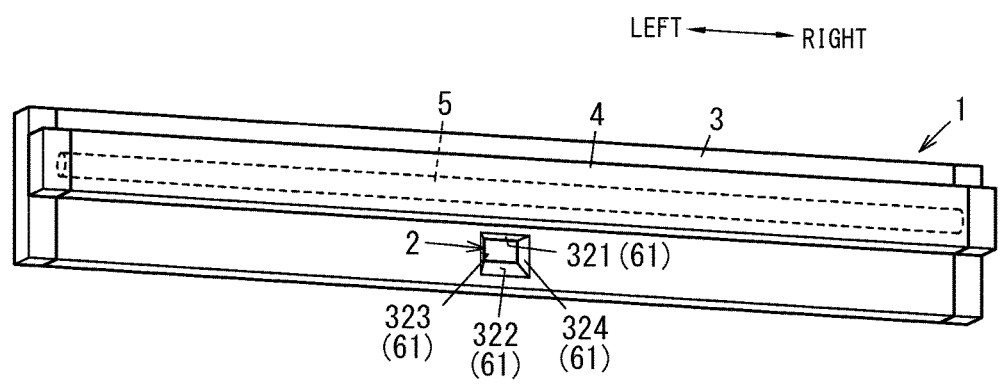
FIG. 2A is a perspective view of the luminaire.
Figure 2B:
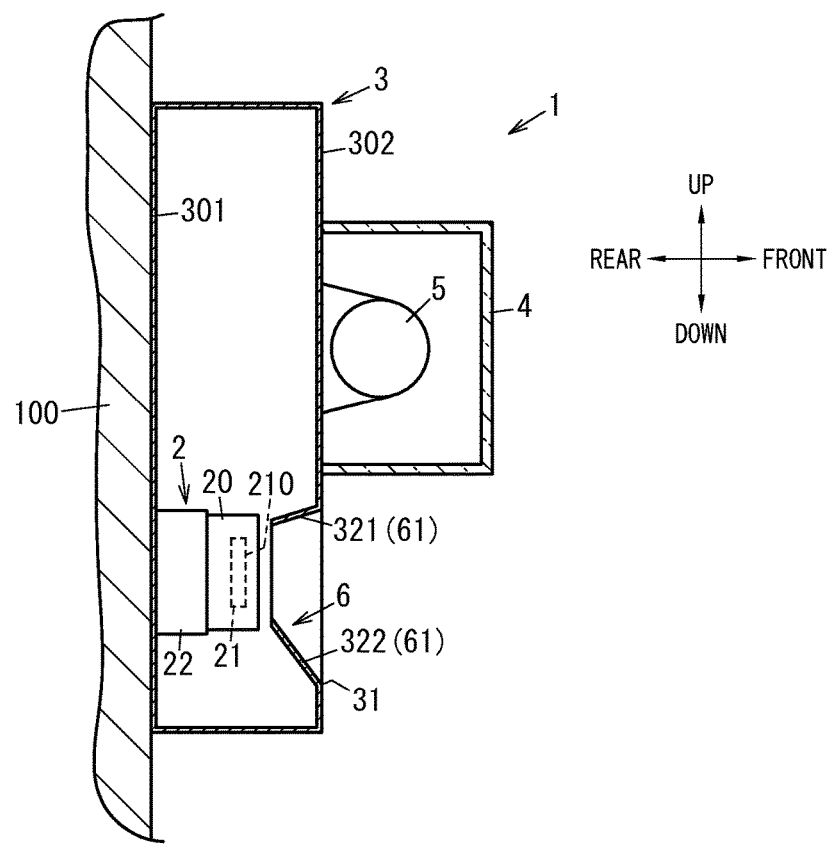
FIG. 2B is a cross-sectional view of the luminaire.
Figure 3:
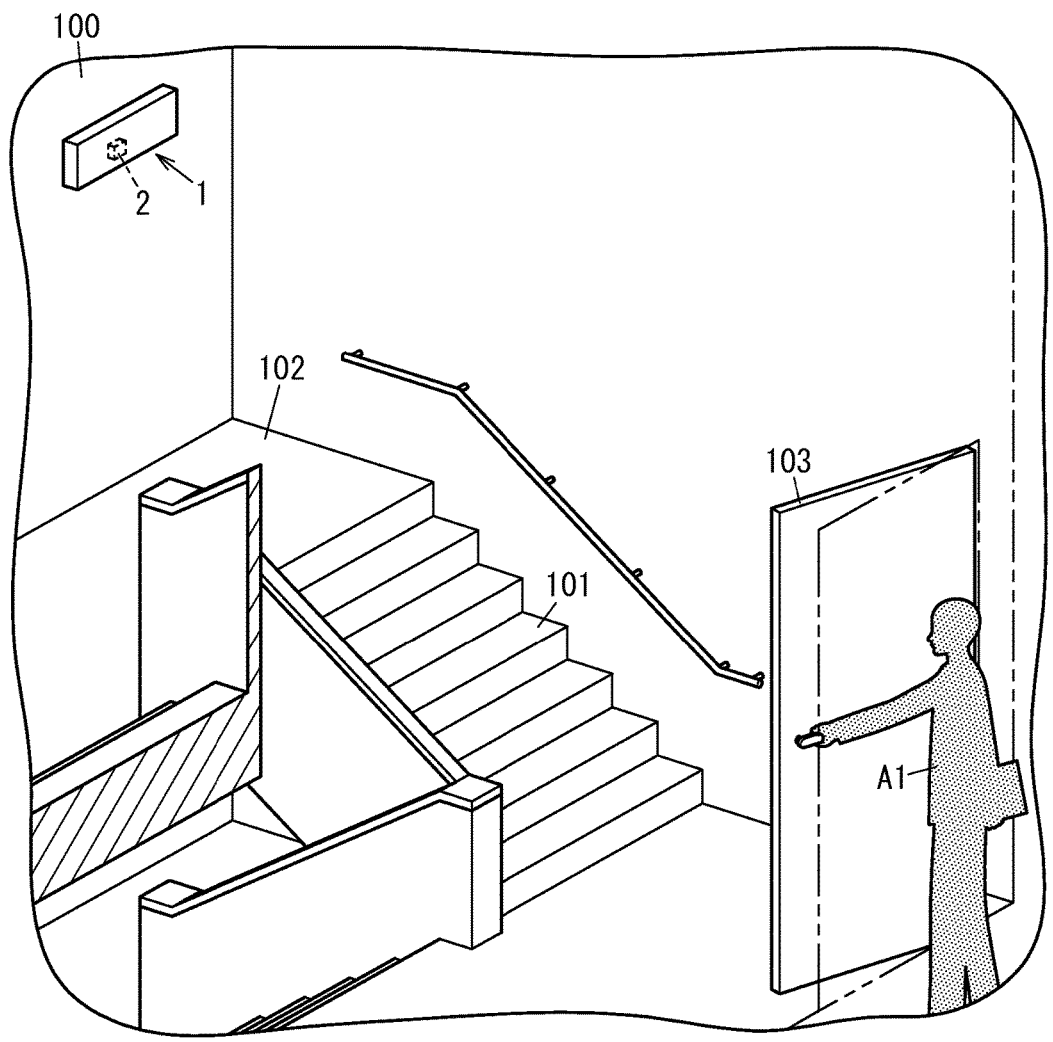
FIG. 3 is a drawing for explaining one application example of the luminaire.

As shown in FIGS. 2A and 2B, the luminaire 1 of the present embodiment includes the radio wave sensor 2, the luminaire body 3, a panel 4, and a light source 5. As shown in FIG. 3, the luminaire 1 of the present embodiment may be installed to the wall 100 on a landing 102 of a stairway 101 that serves as, for example, an evacuation route in a building. In the illustrated example of FIG. 3, the luminaire 1 is disposed, for example, at a position where the stairway 101, the landing 102 and a door 103 of a gateway for leading to the stairway 101 are included in a detection area B1 (refer to FIG. 1) of the radio wave sensor 2.

The radio wave sensor 2 is configured to detect movement of an object, by use e.g., millimeter wave band radio waves. In the present embodiment, the radio wave sensor 2 is configured to detect the movement of the object, by use of radio waves having a frequency of 24 GHz, but is not limited thereto. The radio wave sensor 2 may be configured to detect the movement of the object, by use of radio waves having a frequency other than 24 GHz. Specifications such as a frequency band and antenna power to be used for the radio wave sensor 2 are defined in various countries. In Japan, the frequency to be used for the radio wave sensor 2 is, for example, 24 GHz as described above. In the present embodiment, the object that is a target to be detected by the radio wave sensor 2 is, for example, a human A1 or the door 103 (refer to FIG. 3).

The radio wave sensor 2 includes the antenna 21 (refer to FIG. 1), an oscillator, and a detector. The antenna 21, the oscillator and the detector are housed in a casing 20 having a rectangular parallelepiped shape as shown in FIG. 1.

The antenna 21 is formed as a planar antenna such as a microstrip antenna. The antenna 21 is configured to transmit, as radio waves, an oscillation signal made by the oscillator, and output, as a receiving signal, radio waves received. That is, the antenna 21 is for transmitting and receiving radio waves. In the present embodiment, since the radio waves having the frequency of 24 GHz are used as described above, the antenna 21 is configured to receive radio waves in a frequency band that includes the frequency of 24 GHz.

In the present embodiment, an antenna face 210 (refer to FIG. 1), which is a front surface of the antenna 21, functions as a transmitting surface for transmitting radio waves forward, and a receiving surface for receiving radio waves. The antenna face 210 is provided so as to face the outside from an opening formed in a front surface of the casing 20. The antenna face 210 is not exposed from the casing 20, but is covered with an antenna cover that is made of resin allowing radio waves to pass through. The antenna cover functions as a protector that protects the antenna 21 from foreign matters (for example, dusts). It further functions as a lens that defines a directivity of radio waves to be transmitted from the antenna 21 when the thickness or the like of the antenna cover is designed adequately.

The detector is configured to mix (multiple) the oscillation signal made by the oscillator and the receiving signal received by the antenna 21, and detect the movement of the object based on the signal obtained by mixing. When an object is present in the detection area B1 of the radio wave sensor 2, a part of the radio waves transmitted from the antenna 21 is reflected by the object. The antenna 21 then receives the part reflected by the object, of the radio waves, and outputs the receiving signal. A frequency of the receiving signal is different, by a frequency depending on a moving speed of the object, from a frequency of the radio waves transmitted, due to the Doppler effect. Accordingly, the signal obtained by mixing has a frequency corresponding to a difference between the frequency of the radio waves transmitted and the frequency of the receiving signal (that is, the signal is a "differential signal").

The detector performs a processing to compare a signal level of the differential signal with a threshold value. The detector is configured to output, when the signal level of the differential signal exceeds the threshold value, a signal (detection signal) indicating that movement of an object has been detected to a control unit (described later). "Output the detection signal" mentioned herein means that, for example, output the detection signal with an H-level to the control unit, the detection signal being a binary signal capable of taking two signal levels of an L-level (Low level) and the H-level (High level). In other words, while not detecting any movement of an object, the detector is outputting the detection signal with the L-level to the control unit.

That is, the radio wave sensor 2 is configured to process the differential signal caused by the movement of the object to detect the movement of the object in the detection area B1, by use of radio waves. Here, the detection area B1 of the radio wave sensor 2 is in an area where reflection waves reflected by the object, of the radio waves transmitted from the antenna 21, can have a signal intensity higher than a reception sensitivity of the radio wave sensor 2. In the present embodiment, the detection area B1 includes at least the landing 102, the stairway 101 directly connected to the landing 102, and the door 103 (refer to FIG. 3). Note that the detection area B1 is not shown in FIG. 3.

As shown in FIG. 2A, the luminaire body 3 is formed as a box elongated along the right-left direction by, for example, bending a metal plate. The luminaire body 3 is attached to the building surface (a wall, in the embodiment) 100. As shown in FIGS. 1 and 2B, the luminaire body 3 includes the first plate (rear plate) 301 and the second plate (front plate) 302 facing each other in a direction (front-back direction) perpendicular to the building surface 100. "Perpendicular" mentioned herein is not limited to completely perpendicular, but include substantially perpendicular. The first plate 301 is attached to the building surface 100. The second plate 302 is positioned on the front side of the first plate 301 with a gap between the first plate 301 and the second plate 302. That is, the second plate 302 is further from the building surface 100 than the first plate 301 is.

As shown in FIGS. 1 and 2B, the luminaire body 3 houses therein the radio wave sensor 2. Specifically, the radio wave sensor 2 is between the first plate 301 and the second plate 302 of the luminaire body 3, and is attached to the first plate 301 with a supporting block 22. That is, the luminaire body 3 holds the radio wave sensor 2 between the first plate 301 and the second plate 302. In the present embodiment, the antenna face 210 of the antenna 21 of the radio wave sensor 2 is substantially in parallel to each of the first plate 301 and the second plate 302. Of course the antenna face 210 may be inclined relative to the first plate 301 and the second plate 302.

In addition, the luminaire body 3 houses therein a power supply unit and the control unit. Furthermore, an emergency light source and an emergency power supply unit may be attached to the luminaire body 3. The emergency light source is lit up when a commercial power supply fails. The emergency power supply unit is provided to light up the emergency light source.

As shown in FIGS. 1, 2A, and 2B, the second plate 302 of the luminaire body 3 is formed therein an opening 31 having a rectangular shape. The opening 31 allows radio waves transmitted from the antenna 21 of the radio wave sensor 2 to exit through to an outside of the luminaire body 3. The radio waves transmitted from the antenna 21 is emitted to the outside of the luminaire body 3 through the opening 31, toward the detection area B1.

As shown in FIG. 2A, each of four pieces (first piece 321, second piece 322, third piece 323, and fourth piece 324) are formed integrally with a periphery of the opening 31 so as to protrude rearward. The first piece 321 is provided at (connected to) an upper edge of the periphery of the opening 31. The second piece 322 is provided at (connected to) a lower edge of the periphery of the opening 31. The third piece 323 is provided at (connected to) a left edge of the periphery of the opening 31. The fourth piece 324 is provided at (connected to) a right edge of the periphery of the opening 31. In the present embodiment, the first piece 321 to the fourth piece 324 are formed by bending parts of the luminaire body 3.

Each of the first piece 321 to the fourth piece 324 is positioned between the antenna 21 and the opening 31. Each of the first piece 321 to the fourth piece 324 is configured to receive part of the radio waves transmitted from the antenna 21. Therefore, each of the first piece 321 to the fourth piece 324 limits a radiation area of the radio waves transmitted from the antenna 21. For example, the first piece 321 is configured to receive specific radio waves directed upper side, of the radio waves transmitted from the antenna 21. Therefore, the first piece 321 prevents the specific radio waves, which are of the radio waves transmitted from the antenna 21 but travel toward the upper side, from being radiated upward. That is, the luminaire body 3 includes the limiter 6 (first piece 321 to fourth piece 324) provided between the antenna 21 and the opening 31 to limit the radiation area of the radio waves transmitted from the antenna 21. In other words, the limiter 6 includes a plate(s) (first piece 321 to fourth piece 324) protruding from the periphery of the opening 31 of the luminaire body 3 toward the first plate 301 (rearward). The plate(s) (first piece 321 to fourth piece 324) may protrude perpendicular to the first plate 301, or alternatively be inclined relative to the first plate 301 by a predetermined angle. "Angle" mentioned here means an angle between the plate (first piece 321 to fourth piece 324) and the first plate 301.

In the present embodiment, each of the first piece 321 to the fourth piece 324 is constituted by a part of the luminaire body 3 made of metal, and thus functions as a reflector 61 for reflecting radio waves. The reflector 61 (first piece 321 to fourth piece 324) is provided at a position to receive radio waves which are of the radio waves transmitted from the antenna 21 but travel toward an outside of the detection area B1. For example, the first piece 321 is provided at a position to receive radio waves which are of the radio waves transmitted from the antenna 21 but travel upward above the detection area B1. Therefore, the first piece 321 reflects the radio waves, which travel upward above the detection area B1, downward to the detection area B1. In the present embodiment, accordingly, intensity of the radio waves transmitted from the antenna 21 is larger in a specific area B2 than in an area other than the specific area B2, where the specific area B2 is within the detection area B1 and where radio waves reflected by the reflector 61 (first piece 321 to fourth piece 324) reach. In one example, as shown in FIGS. 2A and 2B, the limiter 6 is symmetric in the horizontal direction and asymmetric in the vertical direction.

The light source 5 is an LED (Light Emitting Diode) module, elongated along the right-left direction and having a straight tube shape. The LED module includes, for example, a flat-plate shaped substrate elongated along the right-left direction, LEDs mounted on a front surface of the substrate, and a tube member which is elongated along the right-left direction and houses therein the substrate and the LEDs. The light source 5 is attached to the luminaire body 3 by, for example, attaching two bases provided on right and left ends of the light source 5 to two sockets of the luminaire body 3, respectively.

The control unit is configured to operate with electric power supplied by the commercial power supply, and control turning-on and turning-off of the light source 5 in accordance with the detection signal received from the radio wave sensor 2. For example, while the control unit receives the detection signal with the H-level from the radio wave sensor 2, the control unit gives the control signal indicating turning-on of the light source 5 to the power supply unit to turn on the light source 5. For example, after the lapse of a predetermined waiting time period (e.g., several ten seconds) from a time point when the detection signal from the radio wave sensor 2 is stopped, the control unit gives the control signal indicating turning-off or dimming of the light source 5 to the power supply unit to turn off or dim the light source 5. The "time point when the detection signal from the radio wave sensor 2 is stopped" mentioned herein means, for example, "a time point when the signal level of the detection signal is switched from the H-level to the L-level".

In the present embodiment, the control unit allows the light source 5 to turn on, when the radio wave sensor 2 detects that the door 103 is moved from a position of a closed state to a position of an opened state (namely, movement of an object). That is, the light source 5 is lit up at a time point when the human A1 opens the door 103, namely, before the human A1 reaches the front of the stairway 101. In the present embodiment, the control unit allows the light source 5 to turn off or dim, after the lapse of the predetermined waiting time period from a time point when the radio wave sensor 2 no longer detects any movement of an object in the detection area B1. That is, the human A1 moves out of the detection area B1, and then after a while, the light source 5 is lit off or lit up in a dimmed state.

The power supply is configured to convert AC power supplied from the commercial power supply to DC power, and supply the converted DC power to the light source 5. The power supply is further configured to increase and decrease the DC power to be supplied to the light source 5 in accordance with the control signal output from the control unit. For example, the power supply unit supplies, to the light source 5, the DC power required for turning on the light source 5, when receiving the control signal indicating turning-on of the light source 5 from the control unit. The power supply unit stops supplying of the DC power to the light source 5, when receiving the control signal indicating turning-off of the light source 5 from the control unit.

The panel 4 is made of material having a light transmitting property so as to have a box shape elongated along the right-left direction with a rear opening. In the present embodiment, the panel 4 is made of resin. The panel 4 is attached to the luminaire body 3 so as to cover the light source 5. The panel 4 is configured to allow radio waves and light emitted from the light source 5 to at least partially pass through. Provided that the panel 4 is at a position out of the detection area B1 of the radio wave sensor 2, it is sufficient that the panel 4 allows the light emitted from the light source 5 to pass through.

Figure 4:
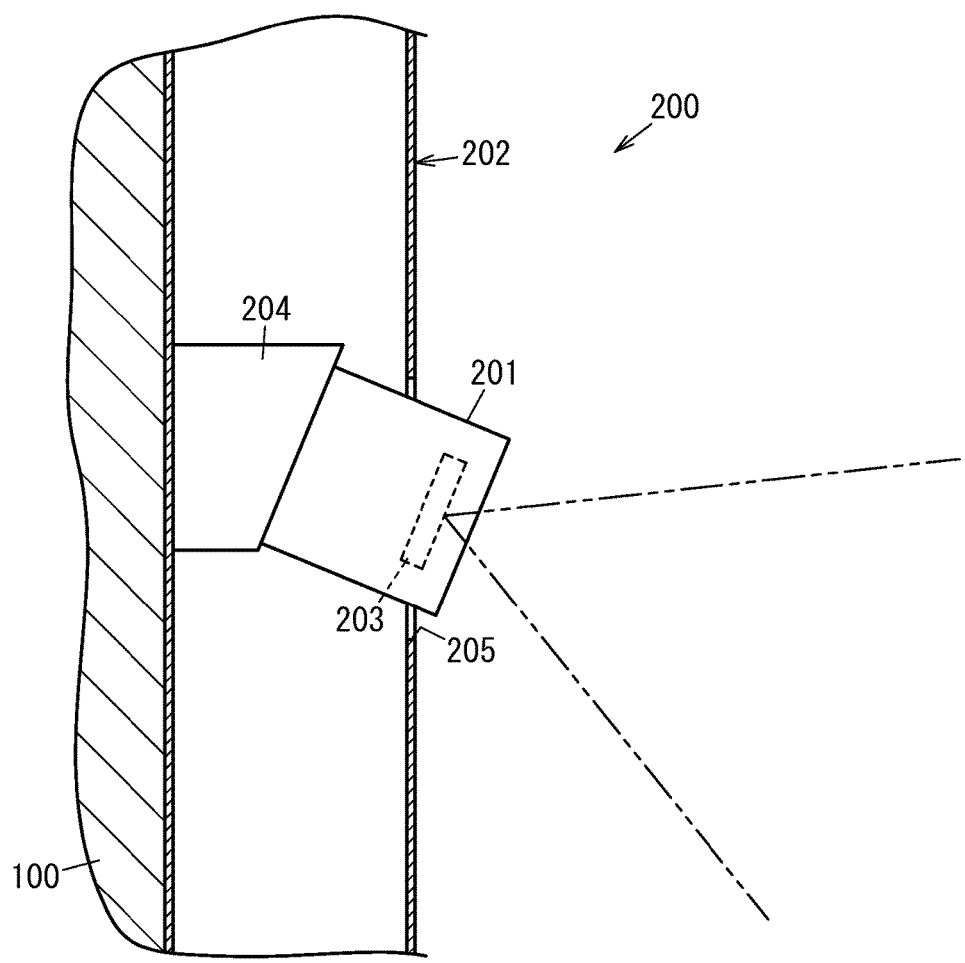
FIG. 4 is a drawing illustrating a luminaire of a comparative example.

A luminaire (hereinafter, referred to as "luminaire 200 of a comparative example") will be explained briefly with reference to FIG. 4. It is supposed that the luminaire 200 of the comparative example is attached to a wall 100 on a landing 102 of a stairway 101, as with the luminaire 1 of the present embodiment. As shown in FIG. 4, the luminaire 200 of the comparative example includes a radio wave sensor 201 and a luminaire body 202. The radio wave sensor 201 includes an antenna 203, and is attached to the luminaire body 202 with a supporting block 204. The luminaire body 202 is attached to a building surface 100. The luminaire body 202 includes an opening 205, but does not include a limiter 6 (first piece 321 to fourth piece 324). The radio wave sensor 201 is exposed from the opening 205, and an antenna face of the antenna 203 is inclined relative to the building surface 100. Note that two-dot chain line in FIG. 4 indicates a radiation area of radio waves transmitted from the antenna 203 of the radio wave sensor 201.

When the luminaire 200 of the comparative example is installed to the wall 100 on the landing 102 of the stairway 101, the radio wave sensor 201 needs to be inclined so that the stairway 101, the landing 102, and the door 103 are included in a detection area of the radio wave sensor 201. That is, when the luminaire 200 of the comparative example is installed, arrangement of the radio wave sensor 201 needs to be changed by, for example, tilting the antenna 203 of the radio wave sensor 201 according to a desired detection area of the radio wave sensor 201. Therefore, when installing the luminaire 200 of the comparative example, the worker needs to perform a working for changing the arrangement of the radio wave sensor 201 according to the installation location of the luminaire 200. Accordingly, installation working of the luminaire 200 may be difficult.

In the luminaire 200 of the comparative example, the antenna face of the antenna 203 is exposed from the opening 205 for the purpose of preventing the radio waves transmitted from the antenna 203 from being scatted inside the luminaire body 202. The luminaire 200 of the comparative example may therefore has a poor design, due to part of the radio wave sensor 201 exposed on an outside of the luminaire body 202.

In contrast, in the luminaire 1 of the present embodiment, the luminaire body 3 includes the limiter 6 (first piece 321 to fourth piece 324) configured to limit a radiation area of the radio waves transmitted from the antenna 21 of the radio wave sensor 2, as shown in FIGS. 1, 2A, and 2B. Note that two-dot dash lines in FIG. 1 indicate the radio waves transmitted from the antenna 21 of the radio wave sensor 2. In the luminaire 1 of the present embodiment, accordingly, the detection area B1 of the radio wave sensor 2 can be set (determined) by limiting the radiation area of the radio waves transmitted from the antenna 21 by way of the limiter 6, without the need of changing the arrangement of the radio wave sensor 2. Therefore, when installing the luminaire 1 of the present embodiment, the worker can set the detection area B1 of the radio wave sensor 2 by adjusting the limiter 6 according to the installation location of the luminaire 1.

When installing the luminaire 1, it is sufficient for the worker to adjust a direction of the limiter 6 by adjusting the tilting angles of the first piece 321 to the fourth piece 324 according to the desired detection area B1 of the radio wave sensor 2, for example. The luminaire 1 of the present embodiment has an advantage in that the setting work of the detection area B1 of the radio wave sensor 2 can be simplified. Furthermore, in the luminaire 1 of the present embodiment, since the radio wave sensor 2 is between the first plate 301 and the second plate 302 of the luminaire body 3, the radio wave sensor 2 is not exposed on the outside of the luminaire body 3. Therefore, the luminaire 1 of the present embodiment has a good design compared to the luminaire 200 of the comparative example, as well as can allow easy setting of the detection area B1 of the radio wave sensor 2.

In the luminaire 1 of the present embodiment, the limiter 6 includes the reflector 61 (first piece 321 to fourth piece 324) for reflecting radio waves. The reflector 61 is provided at a position to receive radio waves which are of the radio waves transmitted from the antenna 21 but travel toward an outside of the detection area B1. In the luminaire 1 of the present embodiment, the radio waves, which would travel toward the outside of the detection area B1, is reflected to the specific area B2 within the detection area B1 of the radio wave sensor 2. Accordingly, the intensity of the radio waves in the specific area B2 can be increased. When there is an area in which the movement of the object should be detected in enhanced property within the detection area B1, the luminaire 1 of the present embodiment can set (make) the specific area B2.

In the luminaire 1 of the present embodiment, alternatively, the limiter 6 may include an absorber 62 for absorbing radio waves. Preferably, the absorber 62 is provided at a position to receive radio waves which are of the radio waves transmitted from the antenna 21 but travel toward the outside of the detection area B1. This configuration can remove the unnecessary radio waves which are of the radio waves transmitted from the antenna 21 but travel toward the outside of the detection area B1, and thus allowing easy setting of the detection area B1.

Figure 5:
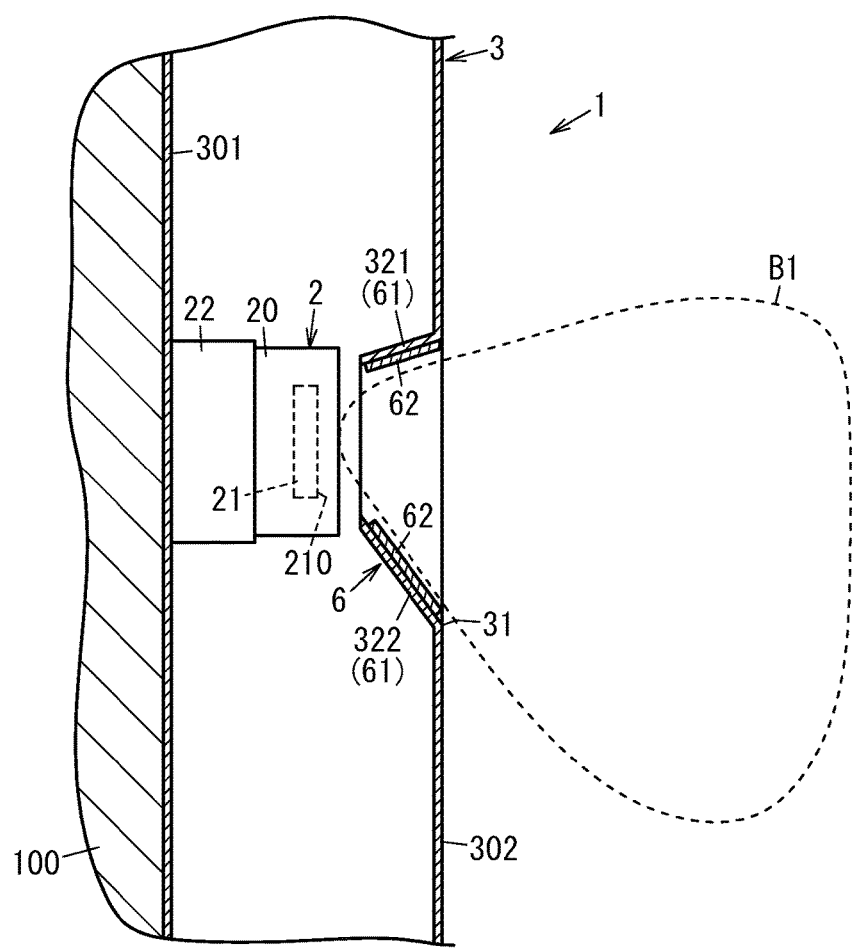
FIG. 5 is a cross-sectional view of a main part of a luminaire including an absorber, according to the embodiment.

In the configuration shown in FIG. 5, the absorber 62 is formed in a sheet shape, and is provided to a surface of each of the first piece 321 to the fourth piece 324 (those provided to each of the first piece 321 and the second piece 322 are shown in the figure). The absorber 62 may be made of elastic base material mixed with magnetic material such as ferrite. With the absorber 62 of this configuration, the energy of radio waves is absorbed due to the loss of energy in the magnetic material (magnetic loss). Alternatively, the absorber 62 may be made of elastic base material mixed with carbonyl iron powder or the like. With the absorber 62 of this configuration, radio waves are reflected on a front surface and on a rear surface of the absorber 62 and cancelled each other out and disappeared (in other words, the radio waves are absorbed). Further alternatively, the absorber 62 may be made of coating material having electromagnetic energy absorbing property, for example. The absorber 62 of this configuration can be formed on each of the first piece 321 to the fourth piece 324 by applying the coating material to the surface of each of the first piece 321 to the fourth piece 324.

It is optional whether the limiter 6 includes the reflector 61 and the absorber 62. For example, the limiter 6 may include the reflector 61 only, or include the absorber 62 only. Alternatively, the limiter 6 may include both the reflector 61 and the absorber 62. Further alternatively, the limiter 6 may not include any of the reflector 61 and the absorber 62.

Figure 6:
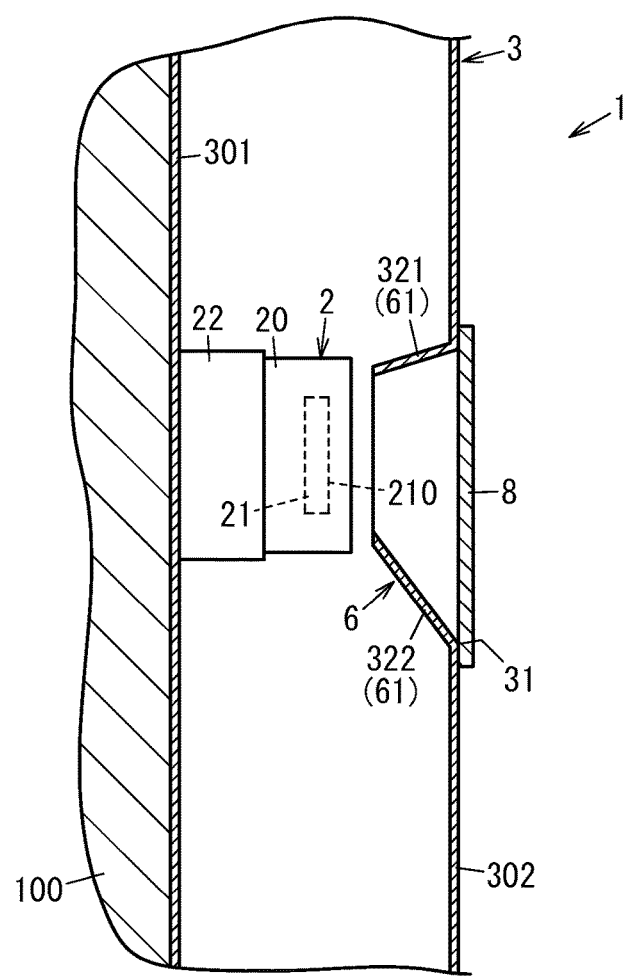
FIG. 6 is a cross-sectional view of a main part of a luminaire including a cover, according to the embodiment.

In the luminaire 1 of the present embodiment, the luminaire body 3 may include a cover 8, as shown in FIG. 6. The cover 8 covers the opening 31 and allows radio waves to pass through. Specifically, the cover 8 is made of resin allowing radio waves to pass through so as to have a rectangular plate shape, and is attached to the luminaire body 3 so as to cover the opening 31. Preferably, the cover 8 is made of resin that has a dielectric constant less than a dielectric constant of glass. The reflection of the radio waves by the cover 8 is further suppressed and radio waves are further allowed to pass through the cover 8, as a dielectric constant is reduced. Of course, the cover 8 may be made of glass. However, the cover 8 is preferably made of resin, because the cover 8 made of resin can provide more options in its color, compared to a cover 8 made of glass. With this configuration, since the radio wave sensor 2 is covered with the cover 8 and less likely to be noticed, and as a result the luminaire 1 has a good design compared to a case where the radio wave sensor 2 is exposed. The cover 8 of the luminaire body 3 is optional.

Figure 7:
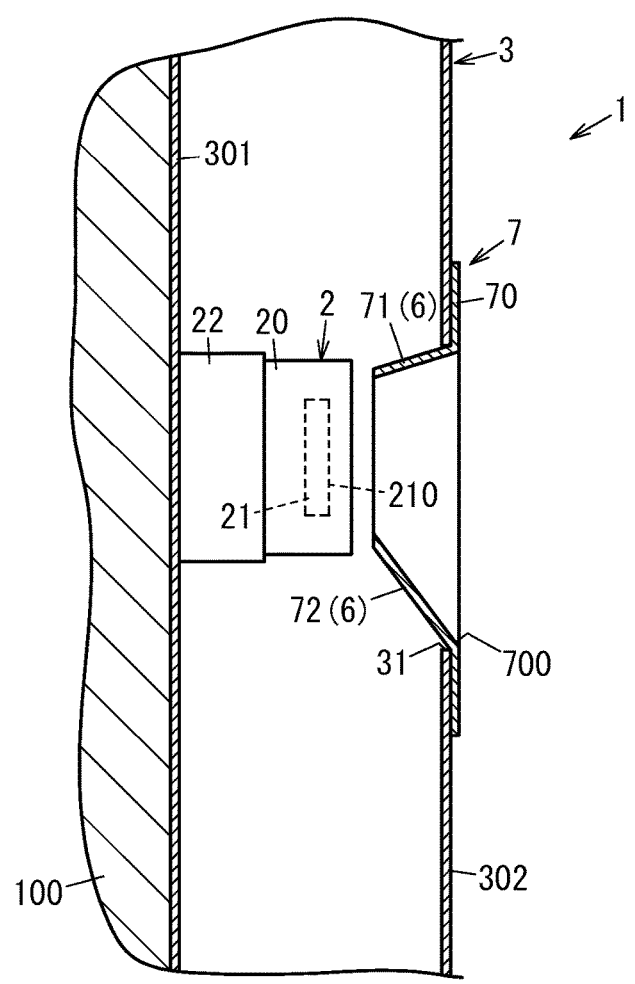
FIG. 7 is a cross-sectional view of a main part of a luminaire including an attachment, according to the embodiment.

In the present embodiment, the limiter 6 is constituted by the first piece 321 to the fourth piece 324 which are parts of the luminaire body 3, but is not limited thereto. In an alternative example, the limiter 6 may be a part of an attachment 7 detachably attached to the periphery of the opening 31 of the luminaire body 3, as shown in FIG. 7.

Figure 8A:
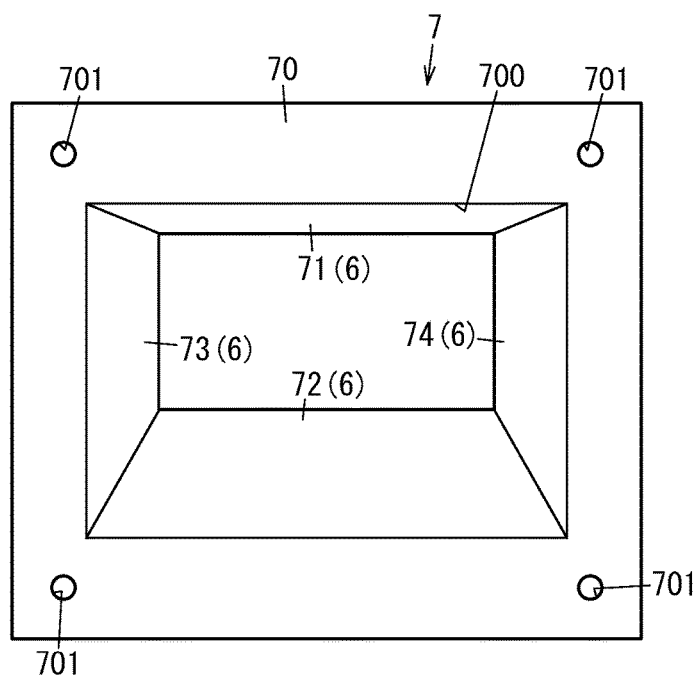
FIG. 8A is a front view of the attachment in the luminaire
Figure 8B:
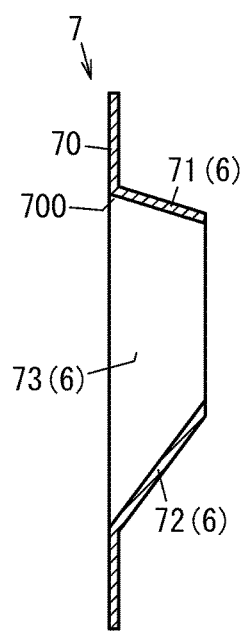
FIG. 8B is a cross-sectional view of the attachment in the luminaire, seen from a right side.
Figure 8C:
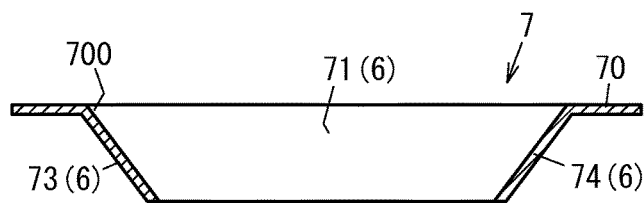
FIG. 8C is a cross-sectional view of the attachment in the luminaire, seen from a lower side.

The attachment 7 is explained in detail hereinafter. For example, the attachment 7 is made of metal plate. As shown in FIGS. 8A to 8C, the attachment 7 includes an attachment piece 70 and four extending pieces (first extending piece 71, second extending piece 72, third extending piece 73, and fourth extending piece 74). The attachment piece 70 has a rectangular frame shape with a center opening 700. The first extending piece 71 to the fourth extending piece 74 protrude rearward from a periphery of the opening 700 of the attachment piece 70. The first extending piece 71 is provided at an upper edge of the periphery of the opening 700. The second extending piece 72 is provided at a lower edge of the periphery of the opening 700. The third extending piece 73 is provided at a left edge of the periphery of the opening 700. The fourth extending piece 74 is provided at a right edge of the periphery of the opening 700.

There are four circular holes 701 formed in respective four corners of the attachment piece 70. The attachment 7 is disposed on the luminaire body 3 so that the attachment piece 70 is on the periphery of the opening 31, and then screws are inserted into the holes 701 to be tightened, and thereby the attachment 7 is attached to the luminaire body 3 (refer to FIG. 7).

In a state where the attachment 7 is attached to the luminaire body 3, the first extending piece 71 to the fourth extending piece 74 are between the antenna 21 and the opening 31 (opening 700). Each of the first extending piece 71 to the fourth extending piece 74 is configured to receive part of the radio waves transmitted from the antenna 21. Therefore, each of the first extending piece 71 to the fourth extending piece 74 limits a radiation area of the radio waves transmitted from the antenna 21. That is, the first extending piece 71 to the fourth extending piece 74 of the attachment 7 serve as the limiter 6. In other words, the limiter 6 includes a plate(s) (first extending piece 71 to fourth extending piece 74) protruding from the periphery of the opening 31 of the luminaire body 3 toward the first plate 301 (rearward).

With this configuration, for setting the detection area B1 of the radio wave sensor 2, it is sufficient to select an attachment 7 appropriate for the installation location of the luminaire 1 from a plurality of attachments 7 prepared in advance and having different shapes or the like according to a desired detection area B1 of the radio wave sensor 2, and to attach the selected attachment 7. With this configuration, in the installation of the luminaire 1, it is sufficient for the worker to attach a selected one of the attachments 7 to the luminaire body 3. The setting work of the detection area B1 of the radio wave sensor 2 can be performed easily.

Since the attachment 7 is made of metal plate in the present embodiment, the first extending piece 71 to the fourth extending piece 74 also function as the reflector 61. Alternatively, the attachment 7 may be made of material that absorbs radio waves, and in this case the first extending piece 71 to the fourth extending piece 74 function as the absorber 62.

<Modification 1>

Hereinafter, a luminaire 1A according to a modification 1 of the embodiment will be described with reference to FIG. 9A. The luminaire 1A of this modification has a similar configuration to the luminaire 1 of the present embodiment other than in further including a reflective plate 9 and therefore, explanations for components similar to those of the luminaire 1 of the embodiment will be omitted. Note that two-dot dash lines shown in FIG. 9A indicate radio waves transmitted from the antenna 21 of the radio wave sensor 2.

Figure 9A:
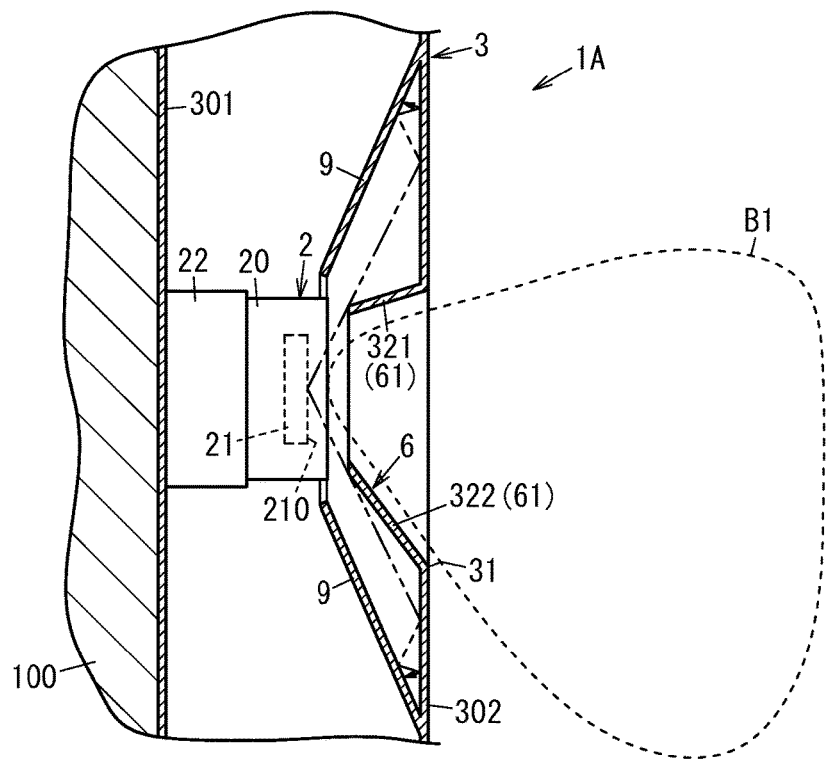
FIG. 9A is a cross-sectional view of a main part of a luminaire according to a modification 1 of the embodiment.

As shown in FIG. 9A, in the luminaire 1A of this modification, a luminaire body 3 includes the reflective plate 9. The reflective plate 9 is a metal plate and is formed integrally with the luminaire body 3. Of course, the reflective plate 9 may be a separate body from the luminaire body 3 in an alternative example. The reflective plate 9 is provided inside the luminaire body 3. In other words, the reflective plate 9 is positioned between the first plate 301 and the second plate 302. The reflective plate 9 is provided at a position to receive radio waves that passes through a gap between the antenna 21 and a limiter 6 (first piece 321 to fourth piece 324) to an inside of the luminaire body 3. FIG. 9A shows the reflective plates 9 provided above and below the radio wave sensor 2 so that the radio wave sensor 2 is positioned therebetween only, but the reflective plates 9 may be provided on a right side and a left side of the radio wave sensor 2 so that the radio wave sensor 2 is positioned therebetween.

It is desirable that the limiter 6 is disposed so as not to form a gap between the limiter 6 and the antenna 21 of the radio wave sensor 2, but in some cases a gap may be formed therebetween due to the accuracy limitation. When there is a gap between the limiter 6 and the antenna 21, the radio waves transmitted from the antenna 21 may pass through the gap to enter the inside of the luminaire body 3. The radio waves entered the inside of the luminaire body 3 may cause bad effect on and generate noises in electric components disposed inside the luminaire body 3. Furthermore, if the radio waves entered the inside of the luminaire body 3 is further reflected and then reach the radio wave sensor 2, the radio waves may generate noises in the radio wave sensor 2.

In the luminaire 1A of this modification, the luminaire body 3 includes the reflective plate 9 for reflecting radio waves. The reflective plate 9 is provided at a position between the first plate 301 and the second plate 302 to receive radio waves passing through the gap between the antenna 21 and the limiter 6. Accordingly, in the luminaire 1A of this modification, the radio waves, which pass through the gap to enter the inside of the luminaire body 3, are multiply reflected by an inner face of the luminaire body 3 and the reflective plate 9 and are attenuated. With this configuration, accordingly, the electric components in the inside of the luminaire body 3 are less likely to be affected by the radio waves, and the noises on the electric components can be reduced. Note that the reflective plate 9 is preferably provided so as to separate a region in which the radio wave sensor 2 is disposed from a region in which the electric components are disposed.

Figure 9B:
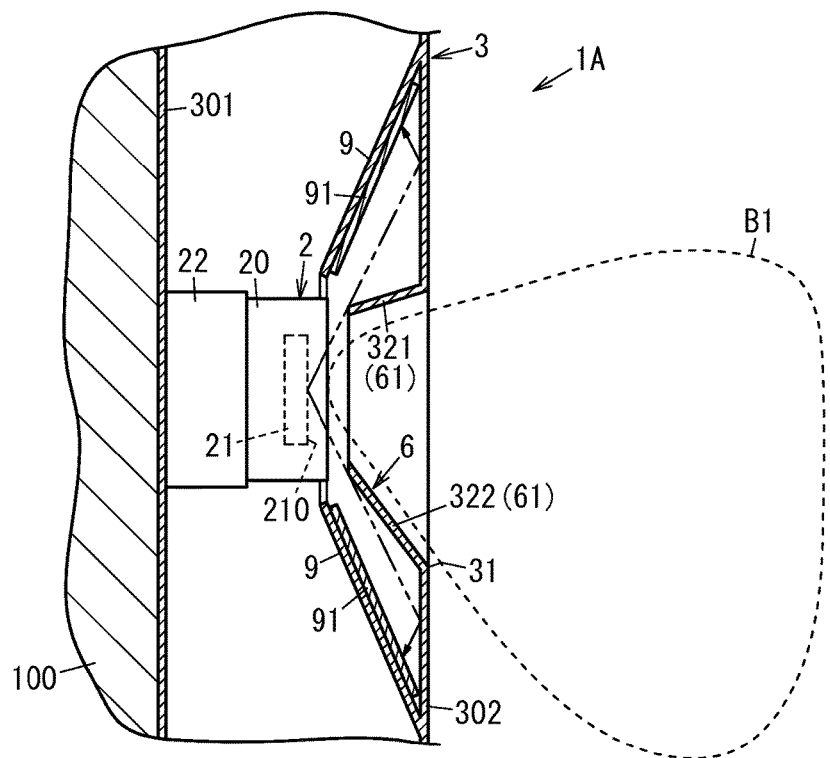
FIG. 9B is a cross-sectional view of a main part of a luminaire including an absorber, according to the modification 1 of the embodiment.

As shown in FIG. 9B, in the luminaire 1A of this modification, an absorption member 91 for absorbing radio waves may be provided to the reflecting plate 9. For example, the absorption member 91 is formed in a sheet shape, and is provided to a surface of the reflective plate 9. The absorption member 91 may have similar configuration to the absorber 62 in the luminaire 1 of the embodiment. Additionally or alternatively, an absorption member 91 may be provided to a surface other than the reflective plate 9, which is inside the luminaire body 3 and to which radio waves reach. Note that two dot dash line shown in FIG. 9B indicate the radio waves transmitted from the antenna 21 of the radio wave sensor 2.

With this configuration, the radio waves, which pass through the gap between the antenna 21 and the limiter 6 to enter the inside of the luminaire body 3, reach the absorption member 91 and be disappeared. With this configuration, therefore, the electric components provided inside the luminaire body 3 are less likely to be affected by radio waves, and noises on the electric components can be reduced.

<Modification 2>

Hereinafter, a luminaire 1B according to a modification 2 of the present embodiment will be described with reference to FIG. 10. The luminaire 1B according to this modification has a similar configuration to the luminaire 1 of the present embodiment other than in further including a third plate 303 and a coupler 33, and therefore, explanations for components similar to those of the luminaire 1 of the embodiment will be omitted.

Figure 10:
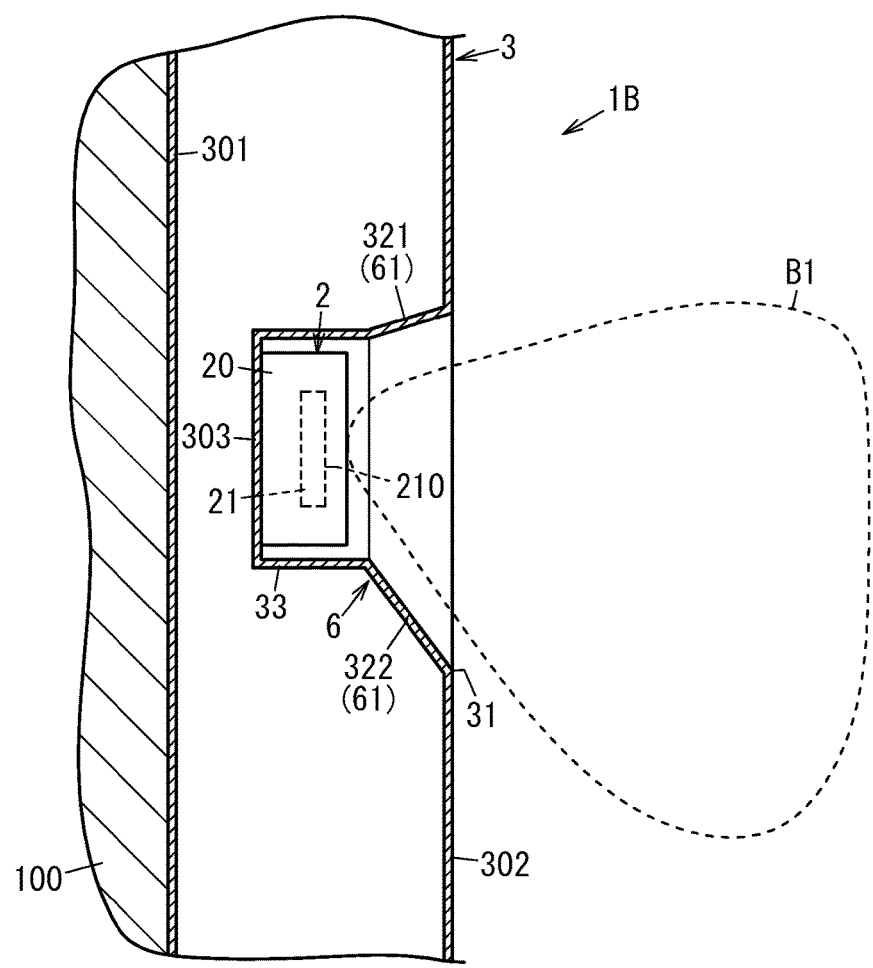
FIG. 10 is a cross-sectional view of a main part of a luminaire according to a modification 2 of the embodiment.

As shown in FIG. 10, in the luminaire 1B of this modification, a luminaire body 3 includes the third plate 303 and the coupler 33. The third plate 303 is between a first plate 301 and a second plate 302. The third plate 303 has an area smaller than each of areas of the first plate 301 and the second plate 302. Specifically, it is sufficient that the third plate 303 has the area to which a radio wave sensor 2 is attachable. The radio wave sensor 2 is attached to the third plate 303. Of course, the radio wave sensor 2 may be attached to the third plate 303 with a supporting block 22.

The coupler 33 is configured to couple a periphery of the third plate 303 and each rear end of the limiter 6 (first piece 321 to fourth piece 324). That is, the third plate 303, the coupler 33, and the limiter 6 are each a part of the luminaire body 3 and are formed integrally and continuously.

As described above, in the luminaire 1B of this modification, the luminaire body 3 includes the third plate 303 which is positioned between the first plate 301 and the second plate 302 and to which the radio wave sensor 2 is attached. The third plate 303 is formed integrally with the periphery of the opening 31 of the luminaire body 3 with the limiter 6 (first piece 321 to fourth piece 324) in-between. Since no gap is formed between the antenna 21 of the radio wave sensor 2 and the limiter 6, the luminaire 1B of this modification can prevent the radio waves transmitted from the antenna 21 from entering the inside of the luminaire body 3.

In the luminaire 1B of this modification, the third plate 303, the coupler 33, and the limiter 6 may be an attachment. The luminaire 1B of this modification can be realized by attaching the attachment, to the periphery of the opening 31 of the luminaire body 3. An absorption member 91 may be provided to a surface of the third plate 303 and the coupler 33.

In each of the luminaires 1A and 1B of the modification 1 and 2, the luminaire body 3 may include a cover 8 covering the opening 31, as with the luminaire 1 of the embodiment.

In each of the luminaires 1, 1A, and 1B of the embodiment, modifications 1 and 2, the light source 5 may be a discharge lamp such as a fluorescent lamp or a high-luminance discharge lamp, instead of the LED module. When the discharge lamp is applied as the light source 5, the light source 5 is preferably further provided on a rear side thereof with a reflector to reflect light emitted backward by the light source 5 to the front. Also when the discharge lamp is applied as the light source 5, the power supply unit is preferably configured to supply AC power to the light source 5. The shape of the light source 5 is not limited to the above-mentioned shape. For example, the light source 5 may be an annular ring-shaped discharge lamp.

The luminaires 1, 1A, and 1B of the embodiment and modification 1 and 2 are installed to the wall 100 on the landing 102 of the stairway 101, but the installation location is not limited to the wall 100. For example, the luminaires 1, 1A and 1B may be installed to a ceiling above the landing 102 of the stairway 101. In addition, the installation location of each of the luminaires 1, 1A and 1B is not limited to the landing 102 of the stairway 101. For example, the luminaires 1, 1A and 1B may be installed to a wall or a ceiling in a residential space of a building.

In each of the luminaires 1, 1A and 1B of the embodiment, modifications 1 and 2, the antenna 21 has the single antenna face 210 that serves as both a transmitting surface for transmitting radio waves and a receiving surface for receiving radio waves, but the transmitting and receiving surfaces may be provided independently with each other. Alternatively, the radio wave sensor 2 may include a transmitting antenna and a receiving antenna, instead of the antenna 21 serving as both transmitting and receiving.

As apparent from the above explanations, a luminaire (e.g., 1, 1A, 1B) of a first aspect includes a radio wave sensor (2) and a luminaire body (3). The radio wave sensor (2) is configured to determine whether an object is present in a detection area (B1), based on a Doppler effect resulting from a movement of the object, by using radio waves. The luminaire body (3) includes a first plate (301) to be attached to a building surface (100) and a second plate (302) facing each other forming an internal space. The luminaire body (3) holds the radio wave sensor (2) between the first plate (301) and the second plate (302). The radio wave sensor (2) includes an antenna (21) for transmitting and receiving the radio waves. The luminaire body (3) includes an opening (31) and a limiter (6). The opening (31) is formed in the second plate (302) to allow radio waves transmitted from the antenna (21) to exit to an outside of the luminaire body (3). The limiter (6) is provided between the antenna (21) and the opening (31) to limit a radiation area of the radio waves transmitted from the antenna (21).

A luminaire (e.g., 1, 1A, 1B) of a second aspect would be realized in combination with the first aspect. In the second aspect, the limiter (6) includes one or more plates (first piece (321) to fourth piece (324)) protruding from a periphery of the opening (31) of the luminaire body (3) toward the first plate (301).

A luminaire (e.g., 1) of a third aspect would be realized in combination with the first or second aspect. In the third aspect, the limiter (6) includes a reflector (61) for reflecting the radio waves. The reflector (61) is provided at a position to receive radio waves which are of the radio waves transmitted from the antenna (21) and travel toward an outside of the detection area (B1).

A luminaire (e.g., 1) of a fourth aspect would be realized in combination with any of the first to the third aspects. In the fourth aspect, the limiter (6) includes an absorber (62) for absorbing the radio waves. The absorber (62) is provided at a position to receive radio waves which are of the radio waves transmitted from the antenna (21) and travel toward an outside of the detection area (B1).

A luminaire (e.g., 1A) of a fifth aspect would be realized in combination with any of the first to the fourth aspects. In the fifth aspect, the luminaire body (3) further includes a reflective plate (9) for reflecting the radio waves. The reflective plate (9) is provided at a position between the first plate (301) and the second plate (302) to receive radio waves which are of the radio waves passing through a gap between the antenna (21) and the limiter (6).

A luminaire (e.g., 1A) of a sixth aspect would be realized in combination with the fifth aspect. In the sixth aspect, an absorption member (91) for absorbing the radio waves is provided to the reflective plate (9).

A luminaire (e.g., 1B) of a seventh aspect would be realized in combination with any of the first to fourth aspects. In the seventh aspect, the luminaire body (3) includes a third plate (303). The third plate (303) is positioned between the first plate (301) and the second plate (302) and to which the radio wave sensor (2) is attached. The third plate (303) is connected to the limiter (6) by a coupler (33). The third plate (303), the coupler (33), the limiter (6) and a periphery of the opening (31) of the luminaire body (3) are integrally formed.

A luminaire (e.g., 1, 1A) of an eighth aspect would be realized in combination with any of the first to sixth aspects. In the eighth aspect, the limiter (6) is a part of an attachment (7) which is detachably attached to a periphery of the opening (31) of the luminaire body (3).

A luminaire (e.g., 1, 1A, 1B) of a ninth aspect would be realized in combination with any of the first to eighth aspects. In the ninth aspect, the luminaire body (3) includes a cover (8). The cover (8) covers the opening (31) and allows radio waves to pass through.

A luminaire (e.g., 1, 1A, 1B) of a tenth aspect would be realized in combination with any of the first to seventh and ninth aspects. In the tenth aspect, the limiter (6) is integrally formed with the second plate (302).

A luminaire (e.g., 1, 1A, 1B) of an eleventh aspect would be realized in combination with any of the first to tenth aspects. In the eleventh aspect, the limiter (6) does not protrude from the opening (31) toward an outside of the luminaire body (3).

A luminaire (e.g., 1, 1A, 1B) of a twelfth aspect would be realized in combination with any of the first to eleventh aspects. In the twelfth aspect, a direction of the limiter (6) is adjustable.

With the luminaire (e.g., 1, 1A, 1B), the setting work of the detection area (B1) of the radio wave sensor (2) can be simplified.

The invention claimed is:

1. A luminaire, comprising:
    a radio wave sensor configured to determine whether an object is present in a detection area, based on a Doppler effect resulting from a movement of the object, by using radio waves; and
    a luminaire body, which includes a first plate to be attached to a building surface and a second plate facing each other forming an internal space and holds the radio wave sensor between the first plate and the second plate,
    the radio wave sensor including an antenna for transmitting and receiving the radio waves,
    the luminaire body including:
        an opening formed in the second plate to allow radio waves transmitted from the antenna to exit to an outside of the luminaire body; and
        a limiter provided between the antenna and the opening to limit a radiation area of the radio waves transmitted from the antenna,
    the luminaire body further including a reflective plate for reflecting the radio waves, and
    the reflective plate being provided at a position between the first plate and the second plate to receive radio waves which are of the radio waves passing through a gap between the antenna and the limiter.

2. The luminaire of claim 1, wherein
    the limiter includes one or more plates protruding from a periphery of the opening of the luminaire body toward the first plate.

3. The luminaire of claim 1, wherein:
    the limiter includes a reflector for reflecting the radio waves, and
    the reflector is provided at a position to receive radio waves which are of the radio waves transmitted from the antenna and travel toward an outside of the detection area.

4. The luminaire of claim 1, wherein:
    the limiter includes an absorber for absorbing the radio waves, and
    the absorber is provided at a position to receive radio waves which are of the radio waves transmitted from the antenna and travel toward an outside of the detection area.

5. The luminaire of claim 1, wherein
    an absorption member for absorbing the radio waves is provided to the reflective plate.

6. The luminaire of claim 1, wherein:
    the luminaire body includes a third plate which is positioned between the first plate and the second plate and to which the radio wave sensor is attached, and
    the third plate is connected to the limiter by a coupler, and the third plate, the coupler, the limiter and a periphery of the opening are integrally formed.

7. The luminaire of claim 1, wherein
    the limiter is a part of an attachment which is detachably attached to a periphery of the opening of the luminaire body.

8. The luminaire of claim 1, wherein
    the luminaire body includes a cover covering the opening and allowing radio waves to pass through.

9. The luminaire of claim 1, wherein
    the limiter is integrally formed with the second plate.

10. The luminaire of claim 1, wherein
    the limiter does not protrude from the opening toward an outside of the luminaire body.

11. The luminaire of claim 1, wherein
    a direction of the limiter is adjustable.

12. A luminaire, comprising:
    a radio wave sensor configured to determine whether an object is present in a detection area, based on a Doppler effect resulting from a movement of the object, by using radio waves; and
    a luminaire body, which includes a first plate to be attached to a building surface and a second plate facing each other forming an internal space and holds the radio wave sensor between the first plate and the second plate, the radio wave sensor including an antenna for transmitting and receiving the radio waves, the luminaire body including:
- an opening formed in the second plate to allow radio waves transmitted from the antenna to exit to an outside of the luminaire body; and
- a limiter provided between the antenna and the opening to limit a radiation area of the radio waves transmitted from the antenna, the luminaire body including a third plate which is positioned between the first plate and the second plate and to which the radio wave sensor is attached, and the third plate being connected to the limiter by a coupler, and the third plate, the coupler, the limiter and a periphery of the opening being integrally formed.

\* \* \* \* \*